United States Patent
Bae et al.

(10) Patent No.: US 11,395,286 B2
(45) Date of Patent: Jul. 19, 2022

(54) METHOD FOR TRANSMITTING AND RECEIVING UPLINK CONTROL INFORMATION IN WIRELESS COMMUNICATION SYSTEM AND APPARATUS THEREFOR

(71) Applicant: LG ELECTRONICS INC., Seoul (KR)

(72) Inventors: Duckhyun Bae, Seoul (KR); Seonwook Kim, Seoul (KR); Yunjung Yi, Seoul (KR); Hyunho Lee, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 16/954,500

(22) PCT Filed: Dec. 19, 2018

(86) PCT No.: PCT/KR2018/016249
§ 371 (c)(1),
(2) Date: Jun. 16, 2020

(87) PCT Pub. No.: WO2019/124978
PCT Pub. Date: Jun. 27, 2019

(65) Prior Publication Data
US 2021/0168768 A1    Jun. 3, 2021

Related U.S. Application Data

(60) Provisional application No. 62/607,847, filed on Dec. 19, 2017, provisional application No. 62/617,077, filed on Jan. 12, 2018.

(51) Int. Cl.
*H04W 4/00* (2018.01)
*H04W 72/04* (2009.01)

(52) U.S. Cl.
CPC ..... *H04W 72/042* (2013.01); *H04W 72/0413* (2013.01)

(58) Field of Classification Search
None
See application file for complete search history.

(56) References Cited

U.S. PATENT DOCUMENTS

2011/0299484 A1* 12/2011 Nam ............... H04L 5/0057
370/329
2014/0086174 A1*  3/2014 Nam ............... H04L 1/0026
370/329
(Continued)

FOREIGN PATENT DOCUMENTS

KR     20110009025     1/2011
KR     20130007614     1/2013

OTHER PUBLICATIONS

PCT International Application No. PCT/KR2018/016249, International Search Report dated Apr. 15, 2019, 4 pages.
(Continued)

*Primary Examiner* — Clemence S Han
(74) *Attorney, Agent, or Firm* — Lee Hong Degerman Kang Waimey

(57) ABSTRACT

Disclosed are a method for transmitting and receiving uplink control information in a wireless communication system, and an apparatus therefor. Specifically, a method for transmitting, by a terminal, uplink control information in a wireless communication system comprises the steps of: receiving, from a base station, downlink control information (DCI) for scheduling transmission of the uplink control information; and transmitting the uplink control information to the base station through a physical uplink shared channel on the basis of the DCI, wherein the specific field included in the DCI may include indication information related to
(Continued)

whether only the uplink control information is transmitted through the physical uplink shared channel.

3 Claims, 9 Drawing Sheets

(56) References Cited

U.S. PATENT DOCUMENTS

| | | | |
|---|---|---|---|
| 2014/0362792 A1 | 12/2014 | Cheng et al. | |
| 2018/0019843 A1* | 1/2018 | Papasakellariou | H04L 1/1854 |
| 2018/0110041 A1* | 4/2018 | Bendlin | H04L 5/0051 |
| 2018/0167931 A1* | 6/2018 | Papasakellariou | H04L 5/0053 |
| 2019/0090261 A1* | 3/2019 | Yang | H04L 1/1664 |
| 2019/0199420 A1* | 6/2019 | Faxer | H04B 7/0632 |
| 2020/0059337 A1* | 2/2020 | Yamada | H04W 72/0446 |
| 2021/0203388 A1* | 7/2021 | Tomeba | H04B 7/0626 |

OTHER PUBLICATIONS

Huawei et al., "DCI contents and formats in NR," 3GPP TSG RAN WG1 Meeting #91, R1-1719389, Reno, USA, Nov. 27-Dec. 1, 2017, 11 pages.

Vivo, "DCI contents and design," 3GPP TSG RAN WG1 NR Meeting #91, R1-1719783, Reno, USA, Nov. 27-Dec. 1, 2017, 6 pages.

* cited by examiner

【Fig. 1】
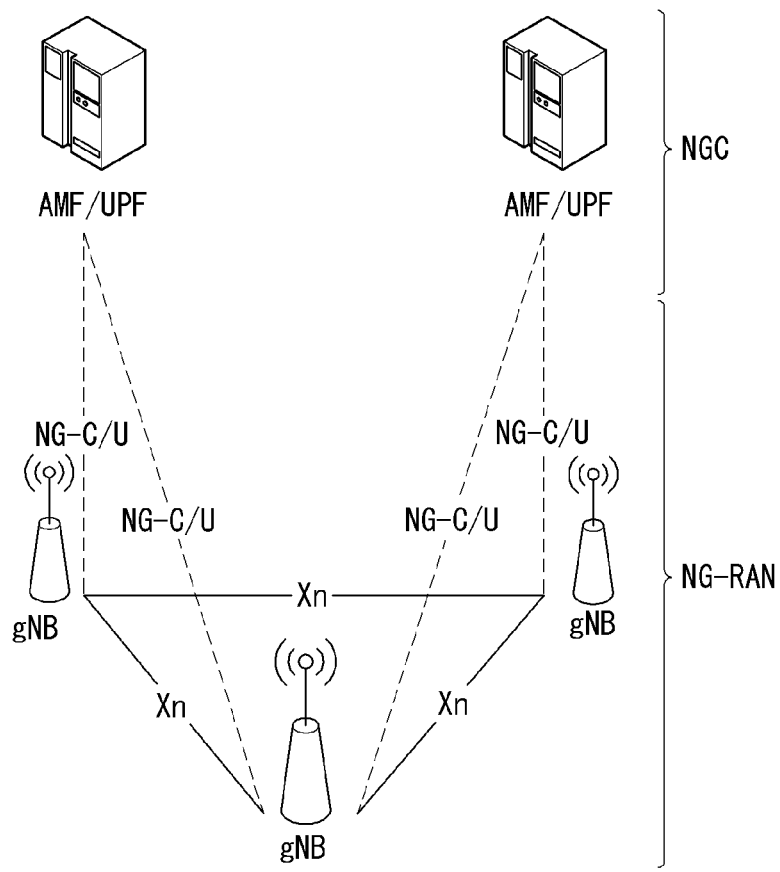
【Fig. 2】
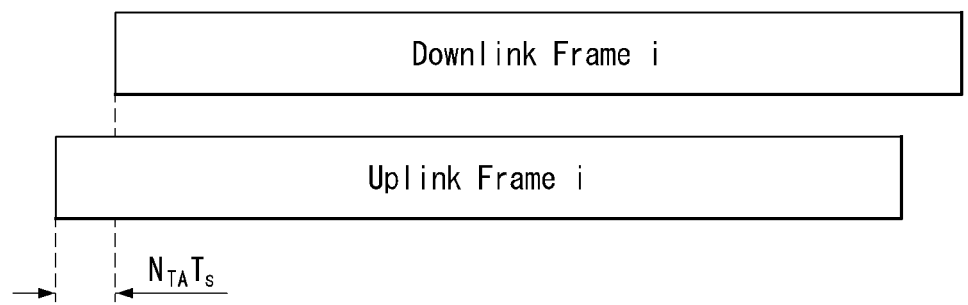

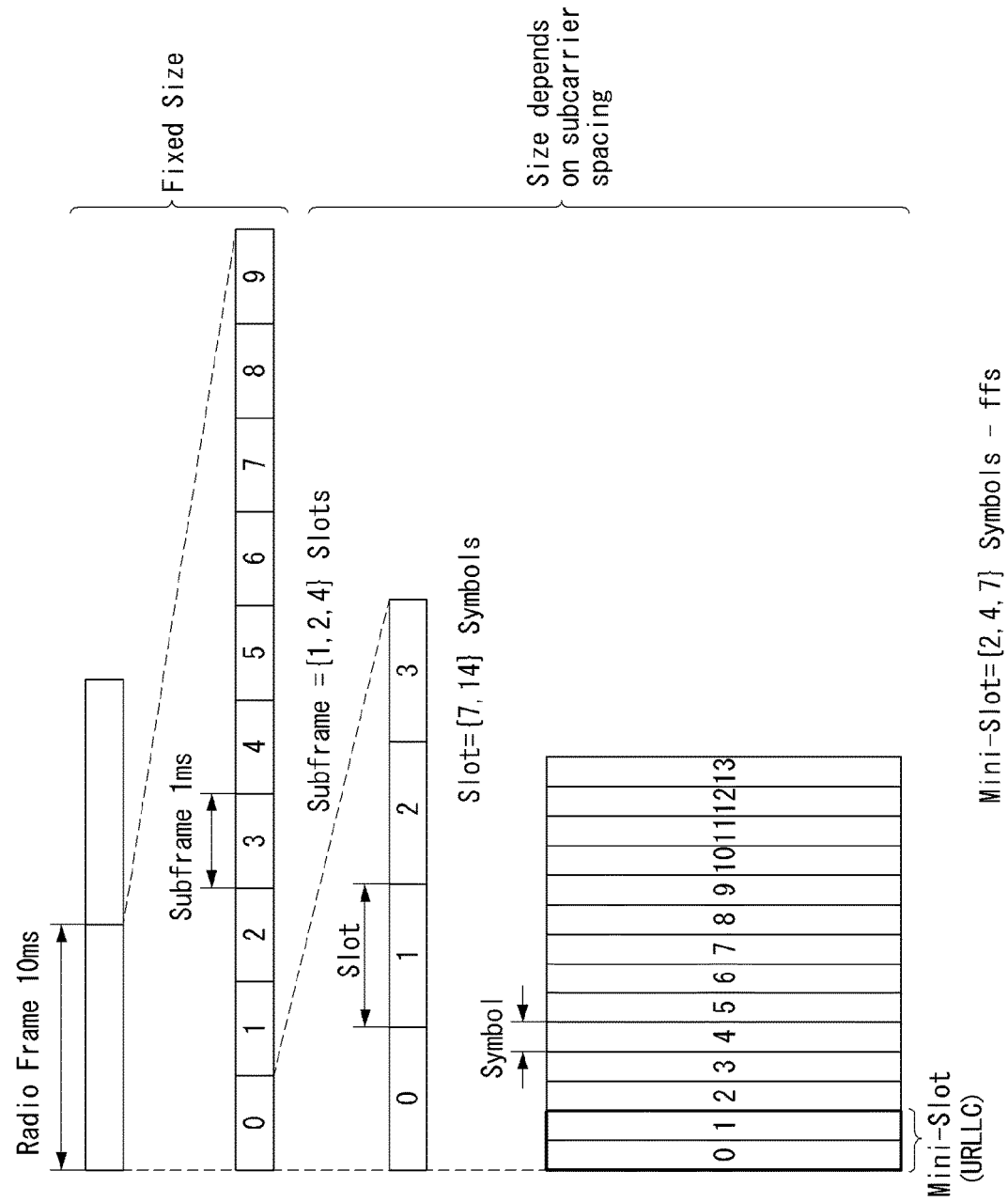
[Fig. 3]

【Fig. 4】
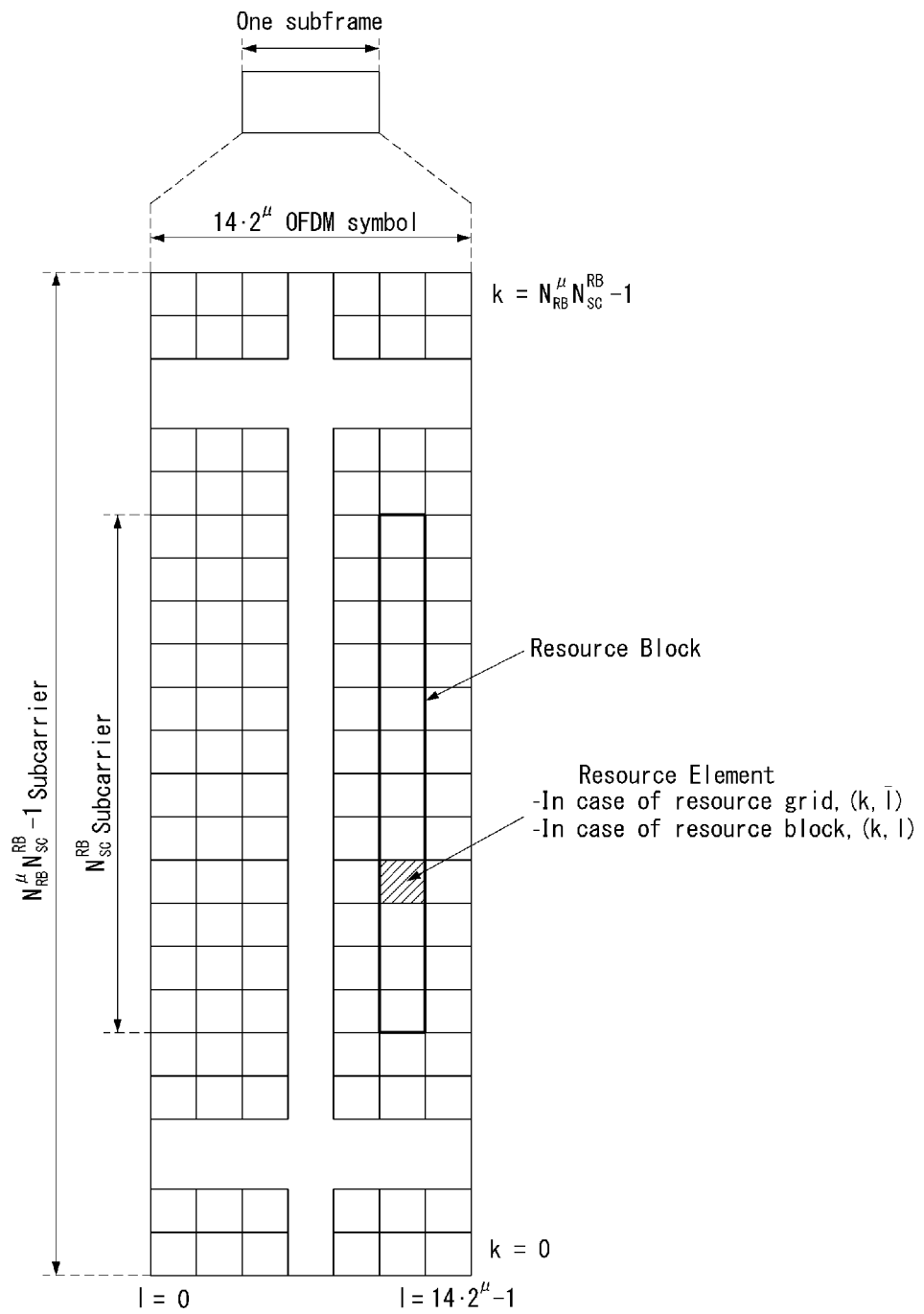

【Fig. 5】
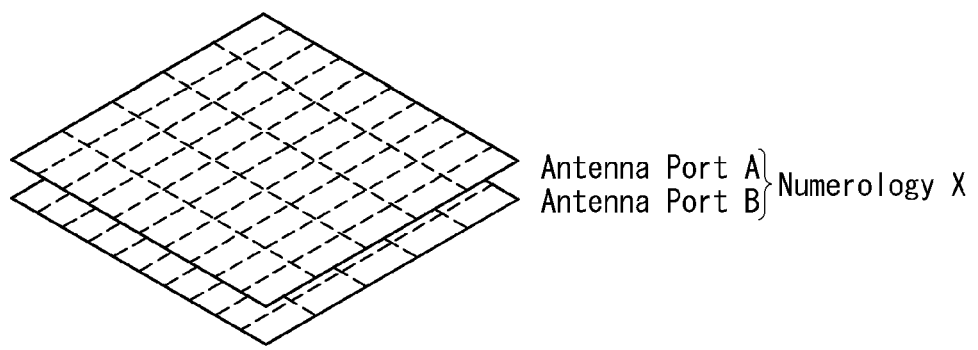
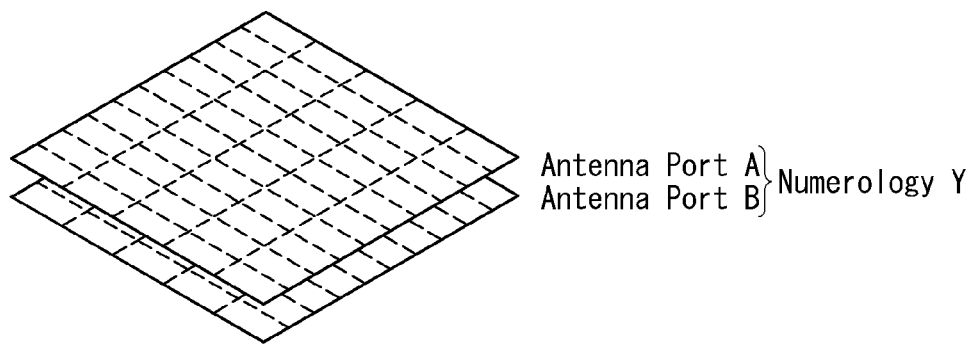

[Fig. 6]
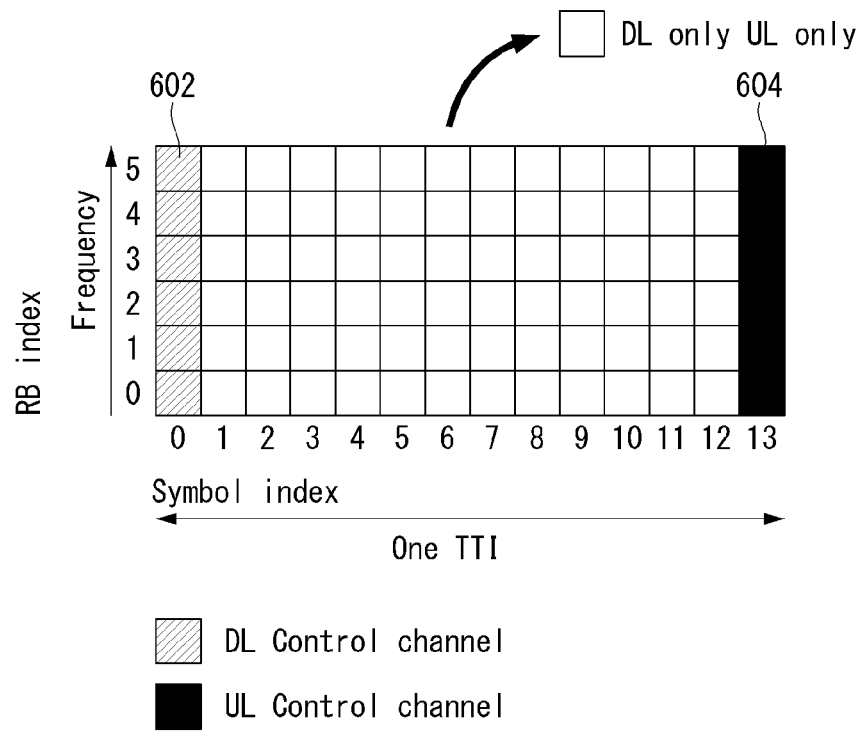
[Fig. 7]
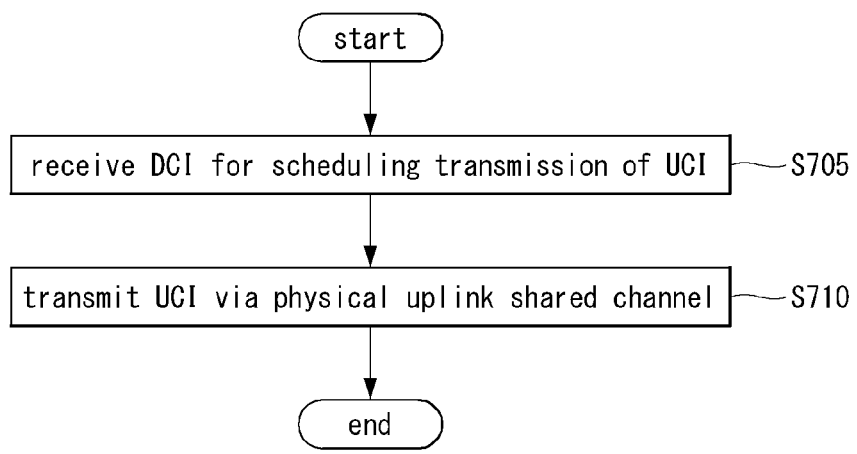

[Fig. 8]
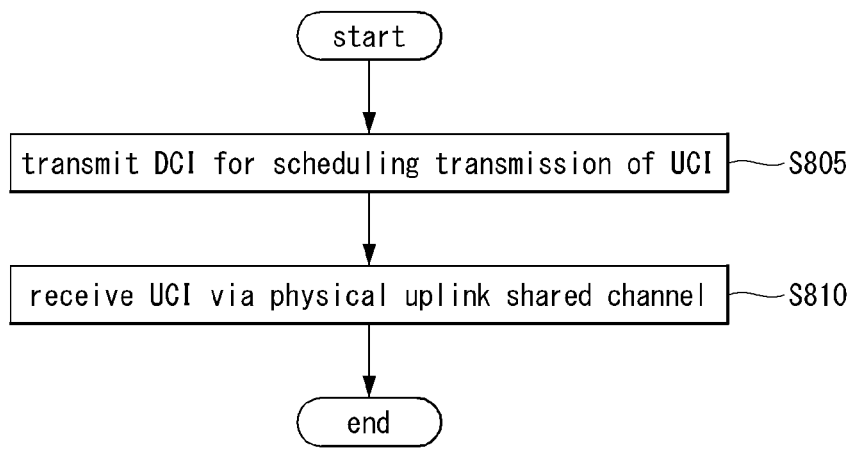
[Fig. 9]
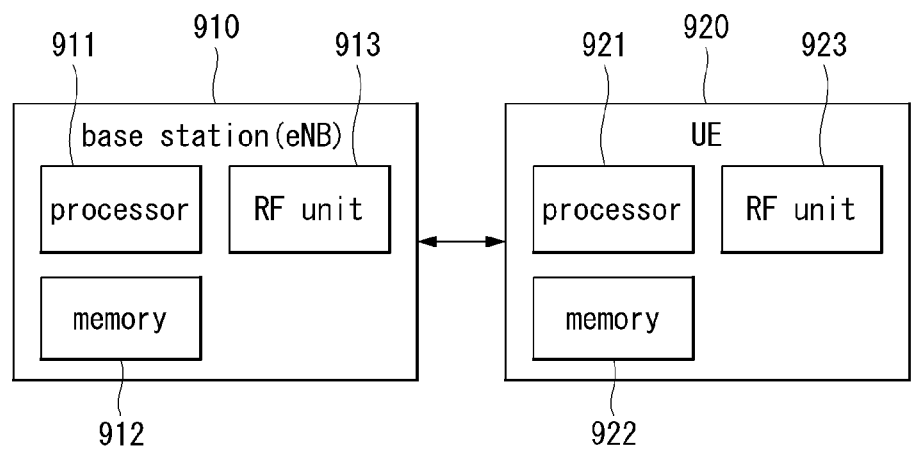

[Fig. 10]
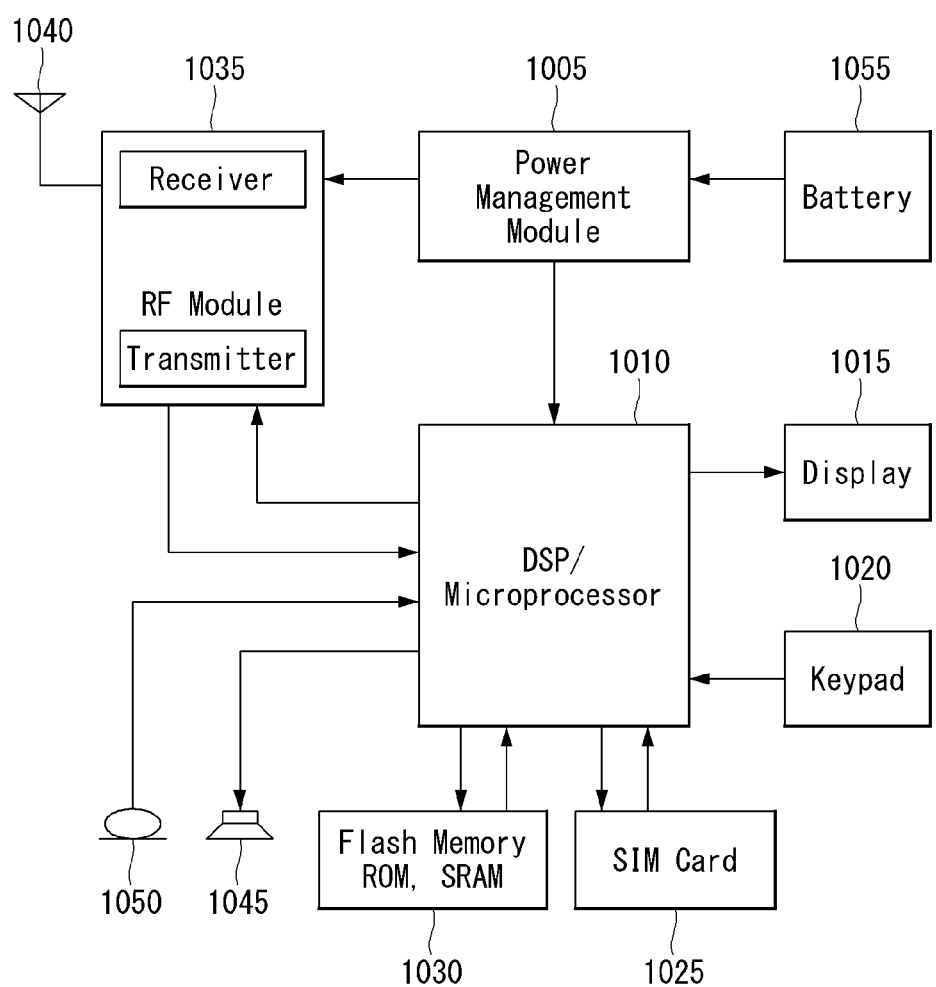

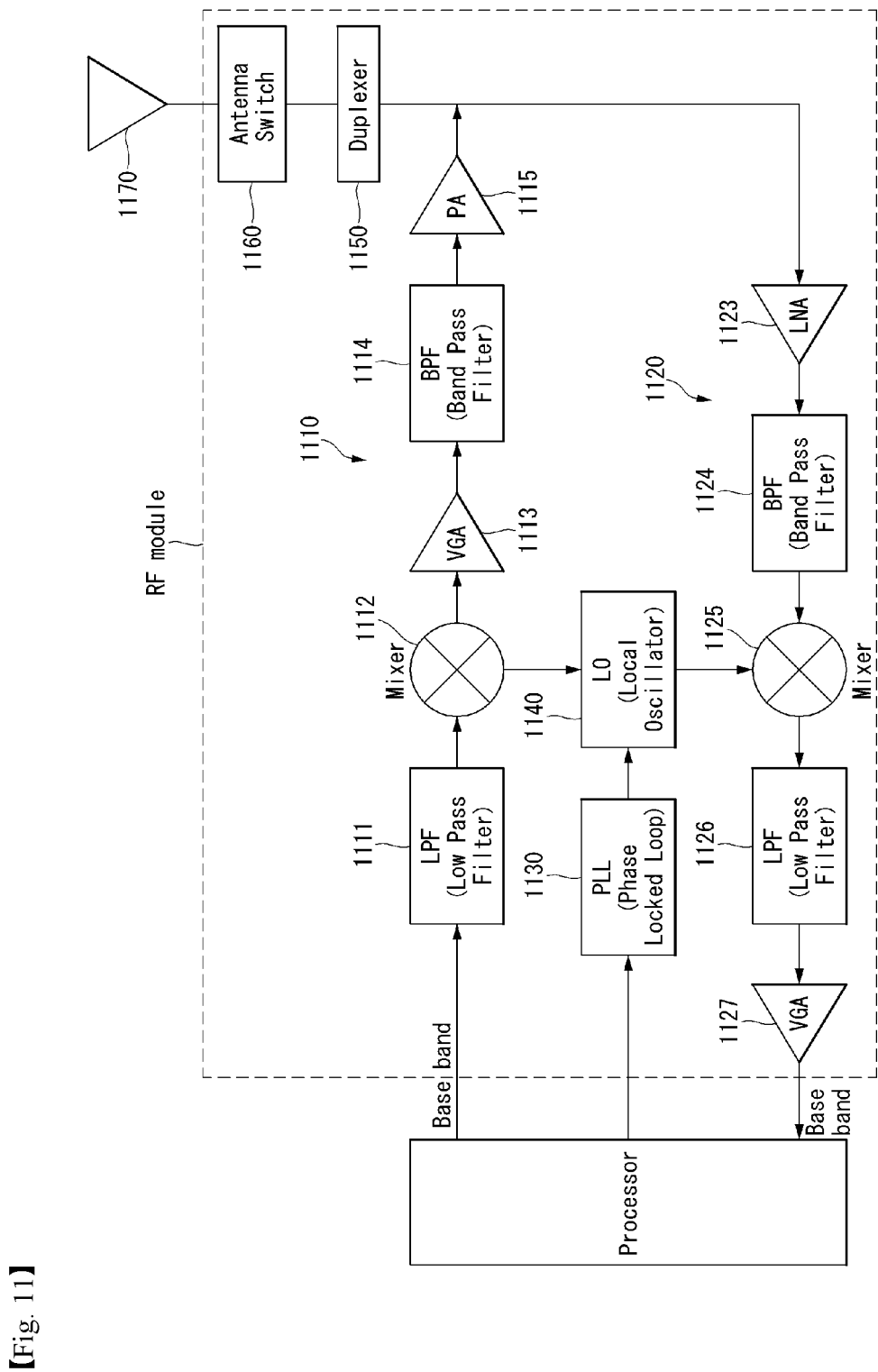
[Fig. 11]

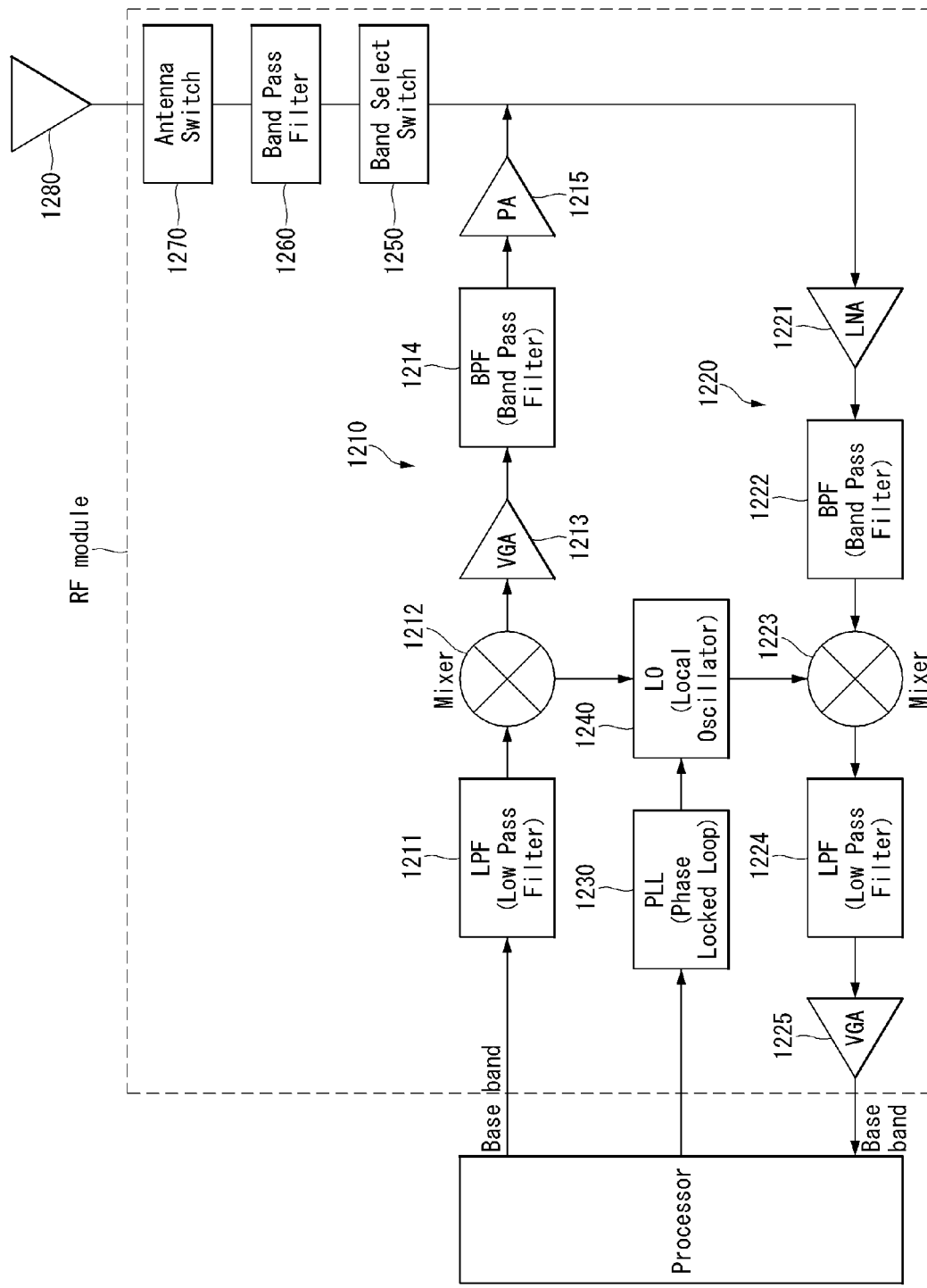
[Fig. 12]

METHOD FOR TRANSMITTING AND RECEIVING UPLINK CONTROL INFORMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/016249, filed on Dec. 19, 2018, which claims the benefit of U.S. Provisional Application Nos. 62/607,847, filed on Dec. 19, 2017, and 62/617,077, filed on Jan. 12, 2018, the contents of which are all hereby incorporated by reference herein in their entirety.

TECHNICAL FIELD

The disclosure relates to a wireless communication system, and more specifically, to a method for transmitting and receiving uplink control information and apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The disclosure proposes a method for transmitting and receiving uplink control information (UCI) in a wireless communication system.

Specifically, the disclosure proposes a method for triggering transmission of uplink control information via an uplink shared channel.

In particular, the disclosure proposes a method for designing downlink control information (DCI) to schedule transmission of uplink control information via an uplink shared channel.

The technical objects to attain in the disclosure are not limited to the above-described technical objects and other technical objects which are not described herein will become apparent to those skilled in the art from the following description.

Technical Solution

According to an embodiment of the disclosure, a method of transmitting uplink control information by a user equipment (UE) in a wireless communication system comprises receiving, from a base station, downlink control information (DCI) for scheduling transmission of the uplink control information and transmitting, to the base station, the uplink control information via a physical uplink shared channel based on the DCI. A specific field included in the DCI may include indication information related to whether only the uplink control information is transmitted via the physical uplink shared channel.

Further, according to an embodiment of the disclosure, in the method performed by the UE, the specific field may be a channel state information (CSI) request field, and the indication information may be a specific value of the CSI request field pre-configured for the uplink control information through higher layer signaling.

Further, according to an embodiment of the disclosure, in the method performed by the UE, the specific field may be a modulation and coding scheme (MCS) field, and the indication information may be a reserved MCS value among pre-configured MCS values.

Further, according to an embodiment of the disclosure, in the method performed by the UE, the specific field may be a hybrid automatic repeat and request (HARQ)-related field, and the indication information may be a specific HARQ process identifier pre-configured for the uplink control information.

Further, according to an embodiment of the disclosure, in the method performed by the UE, the specific field may be a resource allocation field in a time domain, and the indication information may be a starting symbol value of the physical uplink shared channel, pre-configured for the uplink control information.

Further, according to an embodiment of the disclosure, in the method performed by the UE, the specific field may be a resource allocation field, and the indication information may be a resource size in a time domain and/or a resource size in a frequency domain, pre-configured for the uplink control information.

According to an embodiment of the disclosure, a user equipment (UE) transmitting uplink control information in a wireless communication system comprises a radio frequency (RF) unit for transmitting and receiving a radio signal and a processor functionally connected with the RF unit. The processor controls to receive, from a base station, downlink control information (DCI) for scheduling transmission of the uplink control information and transmit, to the base station, the uplink control information via a physical uplink shared channel based on the DCI. A specific field included in the DCI may include indication information related to whether only the uplink control information is transmitted via the physical uplink shared channel.

Further, according to an embodiment of the disclosure, in the UE, the specific field may be a channel state information (CSI) request field, and the indication information may be a specific value of the CSI request field pre-configured for the uplink control information through higher layer signaling.

Further, according to an embodiment of the disclosure, in the UE, the specific field may be a modulation and coding scheme (MCS) field, and the indication information may be a reserved MCS value among pre-configured MCS values.

Further, according to an embodiment of the disclosure, in the UE, the specific field may be a hybrid automatic repeat and request (HARQ)-related field, and the indication information may be a specific HARQ process identifier pre-configured for the uplink control information.

Further, according to an embodiment of the disclosure, in the UE, the specific field may be a resource allocation field in a time domain, and the indication information may be a starting symbol value of the physical uplink shared channel, pre-configured for the uplink control information.

Further, according to an embodiment of the disclosure, in the UE, the specific field may be a resource allocation field, and the indication information may be a resource size in a time domain and/or a resource size in a frequency domain, pre-configured for the uplink control information.

According to an embodiment of the disclosure, a base station receiving uplink control information in a wireless communication system comprises a radio frequency (RF) unit for transmitting and receiving a radio signal and a processor functionally connected with the RF unit. The processor controls to transmit, to a user equipment (UE), downlink control information (DCI) for scheduling transmission of the uplink control information and receive, from the UE, the uplink control information via a physical uplink shared channel based on the DCI. A specific field included in the DCI may include indication information related to whether only the uplink control information is transmitted via the physical uplink shared channel.

Further, according to an embodiment of the disclosure, in the base station, the specific field may be a channel state information (CSI) request field, and the indication information may be a specific value of the CSI request field pre-configured for the uplink control information through higher layer signaling.

Further, according to an embodiment of the disclosure, in the base station, the specific field may be a modulation and coding scheme (MCS) field, and the indication information may be a reserved MCS value among pre-configured MCS values.

Advantageous Effects

According to embodiments of the disclosure, it may be possible to efficiently transmit uplink control information and uplink data via an uplink shared channel. In particular, it is possible to efficiently schedule transmission and reception of uplink control information in systems supporting a small payload size.

Further, according to embodiments of the disclosure, the UE may differentiate downlink control information received from the base station between DCI for assigning a normal PUSCH (e.g., a PUSCH for UL data) and DCI for assigning a PUSCH for UCI transmission without UL data, without losing the flexibility of resource allocation.

Advantages which may be obtained in the disclosure are not limited to the aforementioned effects and other unmentioned advantages will be clearly understood by those skilled in the art from the following description.

DESCRIPTION OF DRAWINGS

The accompanying drawings, which are included herein as a part of detailed descriptions to help understanding the disclosure, provide embodiments of the disclosure and describe technical features of the disclosure with detailed descriptions below.

FIG. 1 illustrates one example of the overall system structure of an NR to which a method proposed by the present specification may be applied.

FIG. 2 illustrates a relationship between an uplink frame and a downlink frame in a wireless communication system to which a method proposed by the present specification may be applied.

FIG. 3 shows an example of a frame structure in an NR system.

FIG. 4 illustrates one example of a resource grid supported by a wireless communication system to which a method proposed by the present specification may be applied.

FIG. 5 shows examples of a resource grid for each antenna port and numerology to which a method proposed in this specification may be applied.

FIG. 6 shows an example of a self-contained structure to which a method proposed in this specification may be applied.

FIG. 7 is a flowchart illustrating operations of a UE transmitting uplink control information in a wireless communication system to which a method as proposed according to the disclosure is applicable.

FIG. 8 is a flowchart illustrating operations of a base station receiving uplink control information in a wireless communication system to which a method as proposed according to the disclosure is applicable.

FIG. 9 is a block diagram illustrating a configuration of a wireless communication device to which methods proposed according to the disclosure are applicable.

FIG. 10 is a block diagram illustrating a configuration of a communication device according to an embodiment of the disclosure.

FIG. 11 is a diagram illustrating an example of the RF module of a wireless communication device to which a method proposed in this specification may be applied.

FIG. 12 is a diagram illustrating another example of the RF module of a wireless communication device to which a method proposed in this specification may be applied.

MODE FOR DISCLOSURE

In what follows, preferred embodiments of the disclosure will be described in detail with reference to appended drawings. Detailed descriptions to be disclosed below with reference to the appended drawings are intended to describe illustrative embodiments of the disclosure but are not intended to represent the sole embodiment of the disclosure. Detailed descriptions below include specific details to provide complete understanding of the disclosure. However, it should be understood by those skilled in the art that the disclosure may be embodied without the specific details to be introduced.

In some cases, to avoid obscuring the gist of the disclosure, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or gNB (generation NB, general NB, gNodeB). Also, a terminal can be fixed or mobile, and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the disclosure, and the specific terms may be used in different ways as long as it does not leave the technical scope of the disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The embodiments of the disclosure may be supported by standard documents disclosed for at least one of wireless access systems such as the IEEE 802, 3GPP, and 3GPP2. In other words, those steps or portions among embodiments of the disclosure not described to clearly illustrate the technical principles of the disclosure may be backed up by the aforementioned documents. Also, all of the terms disclosed in the present document may be described by the aforementioned standard documents.

For the purpose of clarity, descriptions are given mainly with respect to the 3GPP LTE/LTE-A/NR(New RAT), but the technical features of the disclosure are not limited to the specific system.

As smartphones and Internet-of-things (IoT) devices proliferate, the amount of information exchanged over a communication network increases. Thus, an environment (e.g., enhanced mobile broadband communication) for more quickly providing services to more users than legacy communication systems (or legacy radio access technology) do needs to be taken into account for next-generation radio access technology.

To that end, communication systems under discussion consider machine type communication (MTC) that connects multiple devices and objects together and provides services. Also discussed are communication systems (e.g., ultra-reliable and low latency communication (URLLC)) that take account of communication reliability and/or latency-sensitive services and/or terminals.

For illustration purposes, the next generation radio access technology may be referred to below as new radio access technology (new RAT or NR), and NR-applied wireless communication system may be referred to as an NR system.

Definition of Terms eLTE eNB, An eLTE eNB is an evolution of an eNB that supports a connection for an EPC and an NGC.

gNB, A node for supporting NR in addition to a connection with an NGC.

New RAN, A radio access network that supports NR or E-UTRA or interacts with an NGC.

Network slice, A network slice is a network defined by an operator so as to provide a solution optimized for a specific market scenario that requires a specific requirement together with an inter-terminal range.

Network function, A network function is a logical node in a network infra that has a well-defined external interface and a well-defined functional operation.

NG-C, A control plane interface used for NG2 reference point between new RAN and an NGC.

NG-U, A user plane interface used for NG3 reference point between new RAN and an NGC.

Non-standalone NR, A deployment configuration in which a gNB requires an LTE eNB as an anchor for a control plane connection to an EPC or requires an eLTE eNB as an anchor for a control plane connection to an NGC.

Non-standalone E-UTRA, A deployment configuration an eLTE eNB requires a gNB as an anchor for a control plane connection to an NGC.

User plane gateway, A terminal point of NG-U interface.

General System

FIG. 1 is a diagram illustrating an example of an overall structure of a new radio (NR) system to which a method proposed by the disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s = 1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max}N_f/100) \cdot T_s=10$ ms. The radio frame is composed of ten subframes each having a section of $T_{sf}=(\Delta f_{max}N_f/1000) \cdot T_s=1$ ms. In this case, there may be a set of UL frames and a set of DL frames.

FIG. 2 illustrates a relationship between a UL frame and a DL frame in a wireless communication system to which a method proposed by the disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{subframe}^{slots,\mu}-1\}$ in a radio frame. One slot is composed of continuous OFDM symbols of $N_{symb}^\mu$ and, $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols ($N_{symb}^{slot}$) for each slot, the number of slots ($N_{slot}^{frame,\mu}$) for each radio frame, and the number of slots ($N_{slot}^{frame,\mu}$) for each subframe in a normal CP. Table 3 shows the number of OFDM symbols for each slot, the number of slots for each radio frame, and the number of slots for each subframe in an extended CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 3 shows an example of a frame structure in an NR system. FIG. 3 is merely for convenience of description and does not limit the scope of the disclosure.

Table 3 is an example in which μ=2, that is, subcarrier spacing (SCS) is 60 kHz. Referring to Table 2, 1 subframe (or frame) may include 4 slots. A 1 subframe={1,2,4} slots shown in FIG. 3 is an example, and the number of slots that may be included in 1 subframe may be defined like Table 2.

Furthermore, a mini-slot may be configured with 2, 4 or 7 symbols and may be configured with symbols more or less symbols than the 2, 4 or 7 symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 4 illustrates an example of a resource grid supported in a wireless communication system to which a method proposed by the disclosure may be implemented.

Referring to FIG. 4, a resource grid is composed of $N_{RB}^\mu N_{sc}^{RB}$ subcarriers in a frequency domain, each subframe composed of 14·2μ OFDM symbols, but the disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols. Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 5, one resource grid may be configured for the numerology μ and an antenna port p.

FIG. 5 shows examples of a resource grid for each antenna port and numerology to which a method proposed in this specification may be applied.

Each element of the resource grid for the numerology μ and the antenna port p is indicated as a resource element, and may be uniquely identified by an index pair (k,l). Herein, $k=0, \ldots, N_{RB}^\mu N_{sc}^{RB}-1$ is an index in the frequency domain, and $l=0, \ldots, 2^\mu N_{symb}^{(\mu)}-1$ indicates a location of a symbol in a subframe. To indicate a resource element in a slot, the index pair (k,l) is used. Herein, $l=0, \ldots, N_{symb}^\mu-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

Furthermore, a physical resource block is defined as $N_{sc}^{RB}=12$ contiguous subcarriers on the frequency domain.

A point A plays a role as a common reference point of a resource block grid and may be obtained as follows.

offsetToPointA for PCell downlink indicates a frequency offset between the lowest subcarrier of the lowest resource block, overlapping an SS/PBCH block used for a UE for initial cell selection, and the point A, and is represented as a resource block units assuming a 15 kHz subcarrier spacing for FR1 and a 60 kHz subcarrier spacing for FR2;

absoluteFrequencyPointA indicates the frequency-location of the point A represented as in an absolute radio-frequency channel number (ARFCN).

Common resource blocks are numbered from 0 to the upper side in the frequency domain for the subcarrier spacing configuration μ.

The center of the subcarrier 0 of a common resource block 0 for the subcarrier spacing configuration μ is identical with the 'point A.' A resource element (k,l) for a common resource block number $n_{CRB}^\mu$ and the subcarrier spacing configuration μ in the frequency domain may be given like Equation 1 below.

$$n_{CRB}^\mu = \left\lfloor \frac{k}{N_{sc}^{RB}} \right\rfloor \quad \text{[Equation 1]}$$

In this case, k may be relatively defined at the point A so that k=0 corresponds to a subcarrier having the point A as the center. Physical resource blocks are numbered from 0 to $N_{BWP,j}^{size}-1$ within a bandwidth part (BWP). i is the number of a BWP. In the BWP i, the relation between the physical resource block $n_{PRB}$ and the common resource block $n_{CRB}$ may be given by Equation 2 below.

$$n_{CRB}=n_{PRB}+N_{BWP,i}^{start} \qquad \text{[Equation 2]}$$

In this case, $N_{BWP,j}^{start}$ may be a common resource block in which the BWP relatively starts in the common resource block 0.

Self-Contained Structure

A time division duplexing (TDD) structure taken into consideration in an NR system is a structure in which both uplink (UL) and downlink (DL) are processed in one slot (or subframe). This is for minimizing latency of data transmission in the TDD system. The structure may be referred to as a self-contained structure or a self-contained slot.

FIG. 6 shows an example of a self-contained structure according to some implementations of this disclosure. FIG. 6 is merely for convenience of description and does not limit the scope of the disclosure.

Referring to FIG. 6, as in the case of legacy LTE, a case where one transmission unit (e.g., slot, subframe) is configured with 14 orthogonal frequency division multiplexing (OFDM) symbols is assumed.

In FIG. 6, a region 602 means a downlink control region, and a region 604 means an uplink control region. Furthermore, regions (i.e., regions not having separate indication) except the region 602 and the region 604 may be used for the transmission of downlink data or uplink data.

That is, uplink control information and downlink control information may be transmitted in one self-contained slot. In contrast, in the case of data, uplink data or downlink data may be transmitted in one self-contained slot.

If the structure shown in FIG. 6 is used, downlink transmission and uplink transmission are sequentially performed and the transmission of downlink data and the reception of uplink ACK/NACK may be performed within one self-contained slot.

Consequently, when an error occurs in data transmission, the time consumed up to the retransmission of data can be reduced. Accordingly, latency related to data forwarding can be minimized.

In a self-contained slot structure, such as FIG. 6, there is a need for a time gap for a process of a base station (eNodeB, eNB, gNB) and/or a terminal (user equipment (UE)) changing from a transmission mode to a reception mode or of the base station and/or the terminal changing from a reception mode to a transmission mode. In relation to the time gap, when uplink transmission is performed after downlink transmission in a self-contained slot, some OFDM symbol(s) may be configured as a guard period (GP).

Analog Beamforming

In mmWave (mmW) communication systems, as signal wavelength shortens, multiple antennas may be installed in the same area. For example, in a 30 GHz band, the wavelength is about 1 cm, and if antennas are installed at 0.5 lambda intervals on a 5 cm×5 cm panel according to a 2-dimensional array, a total of 100 antenna elements may be installed.

Thus, coverage and throughput may be increased by raising the beamforming (BF) gain using multiple antenna elements in mmW communication systems.

In this case, the installation of a transceiver unit (TXRU) to enable adjustment of transmission power and phase per antenna element allows for independent beamforming per frequency resource.

However, installing TXRUs for all the antenna elements (e.g., 100 antenna elements) may lose practicability in light of costs. Thus, it may be considered to map multiple antenna elements to one TXRU and control the beam direction using an analog phase shifter.

Such analog beamforming scheme may generate only one beam direction over the entire band and is thus incapable of frequency-selective beam operation.

Thus, hybrid beamforming may be taken into account. Hybrid beamforming is an intermediate form between digital beamforming and analog beamforming and has B TXRUs fewer than Q antenna elements. In this case, although there are differences in connections between B TXRUs and Q antenna elements, the number of beam directions in which simultaneous signal transmission is possible is limited to B or less.

In NR systems, a UE may be configured to transmit uplink control information (UCI) via an uplink shared channel (i.e., uplink data channel) (e.g., physical uplink shared channel (PUSCH). In this case, the UCI may be multiplexed with the UE's uplink data (i.e., user data) and then transmitted or, without being multiplexed with any uplink data, the UCI may be transmitted. That is, in NR systems, the PUSCH may be configured to carry UCI alone, carry UL data (e.g., UL-shared channel, UL-SCH), or carry the UL data and UCI multiplexed together.

In legacy systems (e.g., LTE systems), to differentiate the DCI for PUSCH for carrying UCI alone, the UE is configured to use the DCI field, e.g., MCS, CSI request field, or frequency-domain resource allocation. However, in NR systems, given supporting a DCI structure different from those of the legacy systems and more various use cases, it may be inefficient or difficult to use the legacy method as it is.

As an example, in the legacy system, a resource allocation of four resource blocks (RBs) or less in the frequency domain is used to determine the DCI for PUSCH carrying only UCI. However, in the NR system, services with a small packet size (i.e., payload size) such as ultra-reliable low latency communication (URLLC) may require frequency resources of 4 RBs or less, and necessary resources may be configured to be smaller than the UCI.

In this sense, the NR system requires new methods for the UE to differentiate the DCI for scheduling the PUSCH carrying UCI alone. Thus, according to the disclosure, there are proposed methods for designing DCI for the UE to differentiate the DCI for scheduling the PUSCH carrying only UCI. Specifically, according to the disclosure, there is proposed a method of design to be able to differentiate DCI using the field(s) constituting the DCI.

Further, the embodiments and/or methods described in the disclosure are differentiated solely for ease of description, and some components in any one method may be replaced, or combined with components of another method.

Method 1

First described is a method for differentiating DCI for scheduling the PUSCH carrying only UCI using the CSI request field.

Specifically, the value of the CSI request field or the field itself may be used.

In the NR system, the CSI request field may be configured via semi-static scheduling (e.g., RRC signaling), or the size of the field may be configured to be variable. Thus, the UE may be configured to differentiate the DCI for scheduling the PUSCH carrying only UCI based on whether the CSI request field has been configured. Or, the UE may be configured to differentiate the DCI based on whether the value of the CSI request field indicates a specific value (e.g., a value preset between the UE and the base station or a value pre-defined according to the specifications) or not.

As an example, where the value of the CSI request field indicates a non-zero value, the UE may determine that the DCI is for UL-SCH-less UCI transmission or minimum UCI transmission. Or in such a case, where the value of the field indicates a specific value set by, e.g., high layer signaling, the UE may determine that this is for UL-SCH-less UCI transmission.

At this time, each value of the CSI request field may be associated with, e.g., a preconfigured UCI transmission parameter via, e.g., high layer signaling. Thus, in such a case, the UCI transmission parameter mapped to each value may correspond to information for identifying whether the UL-SCH is included, i.e., whether the DCI is for UL-SCH-less transmission or minimum UCI transmission.

Method 2

Another method to be considered is a method for differentiating the DCI for scheduling the PUSCH carrying only UCI using the modulation and coding scheme (MCS) field.

Specifically, a reserved MCS region in a predefined MCS table may be utilized for differentiating the DCI. In this case, to determine the modulation order to be utilized for UCI transmission, multiple reserved MCS values may be used for differentiating the DCI.

An example is assumed that I_MCS=n denotes the modulation order m, and I_MCS=n' is the modulation order m'. In such a case, the UE may be configured to use the PUSCH indicated (i.e., scheduled) by the DCI is used for UL-SCH-less UCI transmission if the MCS field of the received DCI is n or n'. However, in this case, different modulation orders, e.g., m or m', may be used.

As a specific example, Tables 4, 5, and 6 below provide a description related to a scheme for setting the above-described reserved MCS value.

TABLE 4

5.1.3.1 Modulation order and target code rate determination
For the PDSCH assigned by a PDCCH with DCI format
1_0/1_1 with CRC scrambled by C-RNTI,
if the higher layer parameter MCS-Table-PDSCH is not set to
'256QAM', the UE shall use $I_{MCS}$ and Table 5.1.3.1-1 to determine
the modulation order ($Q_m$) and Target code rate (R) used in the
physical downlink shared channel.
else
the UE shall use $I_{MCS}$ and Table 5.1.3.1-2 to determine the
modulation order ($Q_m$) and Target code rate (R) used in the
physical downlink shared channel.
end
Table 5.1.3.1-1: MCS index table 1 for PDSCH

| MCS Index $I_{MCS}$ | Modulation Order $Q_m$ | Target code Rate x [1024] R | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |

TABLE 4-continued 5.1.3.1 Modulation order and target code rate determination
For the PDSCH assigned by a PDCCH with DCI format
1_0/1_1 with CRC scrambled by C-RNTI,
if the higher layer parameter MCS-Table-PDSCH is not set to
'256QAM', the UE shall use $I_{MCS}$ and Table 5.1.3.1-1 to determine
the modulation order ($Q_m$) and Target code rate (R) used in the
physical downlink shared channel.
else
the UE shall use $I_{MCS}$ and Table 5.1.3.1-2 to determine the
modulation order ($Q_m$) and Target code rate (R) used in the
physical downlink shared channel.
end
Table 5.1.3.1-1: MCS index table 1 for PDSCH

| MCS Index $I_{MCS}$ | Modulation Order $Q_m$ | Target code Rate x [1024] R | Spectral efficiency |
|---|---|---|---|
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 5

Table 5.1.3.1-2: MCS index table 2 for PDSCH

| MCS Index $I_{MCS}$ | Modulation Order $Q_m$ | Target code Rate x [1024] R | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |

TABLE 5-continued

Table 5.1.3.1-2: MCS index table 2 for PDSCH

| MCS Index $I_{MCS}$ | Modulation Order $Q_m$ | Target code Rate x [1024] R | Spectral efficiency |
|---|---|---|---|
| 30 | 6 | reserved | |
| 31 | 8 | reserved | |

TABLE 6

6.1.4.1 Modulation order and target code rate determination
For the PUSCH is assigned by a DCI format 0_0/0_1 with
CRC scrambled by C-RNTI, If the higher layer parameters
PUSCH-tp is disabled and MCS-Table-PUSCH is not set to
'256QAM',
the UE shall use $I_{MCS}$ and Table 5.1.3.1-1 to determine the
modulation order ($Q_m$) and Target code rate (R) used in the
physical downlink shared channel.
elseif the higher layer parameters PUSCH-tp is disabled and
MCS-Table-PUSCH is set to
'256QAM',
the UE shall use $I_{MCS}$ and Table 5.1.3.1-2 to determine the
modulation order ($Q_m$) and Target code rate (R) used in the
physical downlink shared channel.
elseif the higher layer parameters PUSCH-tp is enabled and
MCS-Table-PUSCH-transform-precoding is not set to
'256QAM',
the UE shall use $I_{MCS}$ and Table 6.1.4.1-1 to determine the
modulation order ($Q_m$) and Target code rate (R) used in the
physical downlink shared channel.
else
the UE shall use $I_{MCS}$ and Table 5.1.3.1-2 to determine the
modulation order ($Q_m$) and Target code rate (R) used in the
physical downlink shared channel.
end
Table 6.1.4.1-1: MCS index table for PUSCH with transform
precoding and 64QAM

| MCS Index $I_{MCS}$ | Modulation Order $Q_m$ | Target code Rate x 1024 R | Spectral efficiency |
|---|---|---|---|
| 0 | 1 | 240 | 0.2344 |
| 1 | 1 | 314 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |
| 29 | 2 | reserved | |
| 30 | 4 | reserved | |
| 31 | 6 | reserved | |

Method 3

Another method to be considered is a method for differentiating the DCI for scheduling the PUSCH carrying only UCI using the redundancy version (RV) field.

As an example, the RV sequence of transmission of UL data (e.g., UL-SCH) may be set to [0000] or [0231]. A scheme to be used in this case is to indicate that the DCI is not for transmission of UL data by indicating RV1, which is an RV less likely to be used. In other words, where the RV field value of the DCI received by the UE is RV1, the UE may recognize that the received DCI is for UCI only.

Method 4

Another method to be considered is a method for differentiating the DCI for scheduling the PUSCH carrying only UCI using the new data indicator (NDI) field.

As an example, given method 3 described above, it may be efficient to set a value, which is not used generally for transmission of new data in a any field of the DCI, as the validation point. Thus, it may be useful to use the NDI value indicating new data, in combination with other methods described herein.

At this time, to represent the NDI value indicating new data, hybrid automatic repeat and request (HARQ) entity may be considered together (that is, HARQ process identifier (ID) (or HARQ PID), or latest NRI value).

Or, in the similar concept to virtual CRC, the NDI value may be fixed to a specific value, 00, or all 1's regardless of the HARQ PID.

Method 5

Another method to be considered is a method for differentiating the DCI for scheduling the PUSCH carrying only UCI using the HARQ ID field.

Generally, since UCI is not retransmitted via an HARQ process, high reliability may be obtained by fixing the HARQ PID to a certain specific value. At this time, when the UE receives DCI assigned no UL data (i.e., UL-SCH), no influence may be had on the HARQ entity corresponding to the HARQ PID.

As an example, when the DCI indicating HARQ PID #1 is determined to be the DCI for UL-SCH-less UCI transmission, the UE may recognize that the DCI is not the DCI for actual HARQ PID #1. Thus, the previous transport block size (TBS) of HARQ PID #1 and previous NDI value may not be varied.

Method 6

A method for differentiating the DCI for scheduling the PUSCH carrying only UCI using the resource allocation information (i.e., resource allocation field) in the time domain may be taken into consideration.

Specifically, the UE may be configured to differentiate the DCI using the starting symbol information of the resource allocation in the time domain. Generally, since a processing time shorter than that for UL-SCH is required for the UE to transmit UCI, a shorter starting symbol may also be supported.

Thus, a specific starting symbol value or region of the resource allocation in the time domain may be used to differentiate the DCI for scheduling the PUSCH carrying only UCI without UL data (i.e., UL-SCH).

Method 7

Another method to be considered is a method for differentiating the DCI for scheduling the PUSCH carrying only UCI using the code block group transmission information (CBGTI) field.

Similar to method 3 described above, since it would be less likely to transmit only small part of CBG upon transmission of new data, the CBGTI field may be used to indicate the DCI for scheduling the PUSCH carrying only UCI in combination with the NDI.

As an example, the DCI for scheduling the PUSCH carrying only UCI may be determined in a scheme of combining the NDI bit and the value which the most significant bit (MSB) of the field is 1 and the rest are 0's.

Method 8

A method for differentiating the DCI for scheduling the PUSCH carrying only UCI using the resource allocation information (i.e., resource allocation field) in the time domain may be taken into consideration.

Generally, the payload size of UCI is smaller than that of PUSCH transmission. Thus, transmission of UCI only allows the UE to receive a smaller size of resource. Thus, where the size (e.g., transmission duration or number of symbols) of the resource allocated via resource allocation in the time domain is a predetermined value or smaller than the predetermined value, the UE may be configured to use such case to differentiate the DCI. Here, the predetermined value may be pre-defined according to the specifications or may be pre-configured via separate signaling between the UE and the base station.

Or, where the method is used in combination with other methods described herein, a method to be considered to reduce restrictions on the DCI for UL data (i.e., UL-SCH) may be to use the case where the size of the resource allocated is larger than the predetermined value.

Method 9

A method for differentiating the DCI for scheduling the PUSCH carrying only UCI using the resource allocation information (i.e., resource allocation field) in the frequency domain may be taken into consideration.

Generally, the payload size of UCI is smaller than that of PUSCH transmission. Thus, transmission of UCI only allows the UE to receive a smaller size of resource. Thus, where the size (e.g., transmission duration or number of symbols) of the resource allocated via resource allocation in the frequency domain is a predetermined value or smaller than the predetermined value, the UE may be configured to use such case to differentiate the DCI. Here, the predetermined value may be pre-defined according to the specifications or may be pre-configured via separate signaling between the UE and the base station.

Since the NR system supports various services (e.g., eMBB, URLLC, mMTC, etc.), transmission of UL data (i.e., UL-SCH) may have a smaller size than UCI. Thus, it may be efficient to use together the above-described method 8 in using the method.

As an example, where the transmission duration allocated via DCI is identical to or larger than (i.e., not less than) X symbols and where the RB size allocated is identical to or smaller than (i.e., not more than) Y (e.g., X=7 and Y=4), the UE may determine that the DCI is the DCI for scheduling the PUSCH carrying only UCI.

Such operation may be configured depending on the number of RBs allocated regardless of resource allocation types (RA types) or may be configured to operate only in a specific RA type.

Method 10

Also considered is a method for differentiating the DCI for scheduling the PUSCH carrying only UCI using the resource size (e.g., number of REs) derived by combining the resource allocation in the time domain and the resource allocation in the frequency domain.

Such operation may be configured depending on the number of RBs allocated regardless of resource allocation types (RA types) or may be configured to operate only in a specific RA type.

For example, generally, the payload size of UCI is smaller than that of PUSCH transmission. Thus, transmission of UCI only allows the UE to receive a smaller size of resource. Thus, where the size (e.g., transmission duration or number of symbols) of the resource allocated via resource allocation in the time domain is a predetermined value or smaller than the predetermined value, the UE may be configured to use such case to differentiate the DCI.

As a specific example, where the number (N_RE) of REs obtained via the given RA field (i.e., resource allocation information) meets the condition: $N\_RE \leq 4*Q(12*14-RE_{overhead})$, the UE may determine that the DCI is the DCI for scheduling the PUSCH carrying only UCI. Here, function Q may mean a quantization function, such as of a floor, ceiling, or others. Such condition may be preconfigured according to the specifications or may be configured by high layer signaling and/or physical layer signaling (e.g., L1 signaling) by, e.g., the base station.

As another example, where UCI with a specific size is transmitted, the size of resources necessary may also be predetermined. Thus, it may be useful that the UE determines that the resource allocation of a specific size is UL data (i.e., UL-SCH)-less UCI transmission.

As a specific example, it is assumed that UE may identify the bit size X of the UCI to be transmitted via, e.g., the CSI request field. At this time, where the payload size Y corresponding to the resource allocation information and modulation order (i.e., RA+modulation order) given by the DCI meets a predetermined rate K (i.e., Y=X*K) or a specific threshold condition, the UE may determine that this is UL data (i.e., UL-SCH)-less UCI transmission. At this time, the above-described K value may be a predefined value or information (e.g., coding rate in the MCS table) obtained via, e.g., high layer signaling and/or physical layer signaling (e.g., L1 signaling) by the base station.

As another scheme to be considered, after identifying the DCI as the DCI for UL data-less UCI transmission via the above-described method, the UE determines what UCI to transmit in the resource size derived via the resource allocation field. As an example, allocation of a specific size of resource may mean that the UE is configured to transmit only part 1 CSI.

By the above-described methods, the UE may differentiate between the DCI for allocating the PUSCH for UL data (i.e., UL-SCH) and the DCI for allocating the PUSCH for transmission of UCI without UL data.

However, since the above-described methods may restrict the flexibility of PUSCH allocation for UL data (i.e., UL-SCH), a scheme of combining and applying the above-described methods needs to be taken into account.

As an example, where methods 1 to 3 described above simultaneously apply, when a CSI request is enabled, the UE may determine that the DCI indicating RV1 and reserved MCS is the DCI for scheduling the PUSCH carrying only UCI without UL data. As another example, where the above-described methods (1, 2, 3 and 9) or (1, 2, 3, and 10) simultaneously apply, when a CSI request is enabled, the UE may determine that the DCI is the DCI for scheduling the PUSCH carrying only UCI without UL data if the number of RBs obtained from the resource allocation field of the DCI indicating RV1 and the reserved MCS is smaller than (or equal to or smaller than) the value obtained from the signaling of the base station or a predefined value.

Further, since in the NR system, the DCI may have various sizes or various field configurations, different method combinations may apply depending on DCI types (e.g., the length of the CSI request field). At this time, a combination of specific methods may be used basically for differentiating DCI (e.g., methods (1, 2, and 3) or (1, 2, 3, 8, and 9)) or other methods may be added for a separate purpose or depending on the DCI type. As an example, a method additionally combined may be used to differently configure the UCI transmitted by the UE.

The UCI, particularly information to be included in the CSI report, may be determined by the CSI request field contained in the DCI. Each value of the CSI request field may be associated with the UCI transmission parameter preconfigured via, e.g., high layer signaling, as described above in connection with method 1. In this case, the UCI transmission parameter mapped to each value may include information about not only whether UL data (i.e., UL-SCH) is included but also information about the UCI on PUCCH (e.g., CSI on PUCCH). Where the CSI configuration associated with the CSI request field of DCI indicates the information about the CSI on the PUCCH, the DCI may be the DCI triggering the CSI on the PUCCH.

Where the CSI request field is not included in the DCI, the UE may determine that the DCI meeting the other conditions than method 1 described above is the DCI for scheduling the PUSCH carrying only UCI without UL data. As an example, it may be assumed that the DCI for the number of REs obtained from the resource allocation field of DCI indicating RV1 and MCS value when the above-described methods (2, 3, 9) or (2, 3, 10) simultaneously apply, the DCI indicating RV1 and the MCS value when the above-described methods 2 and 3 simultaneously apply, or the case where the number of RBs is smaller (or identical to or smaller than) than a predetermined value or a value obtained from signaling of the base station is the DCI for triggering the CSI on the PUCCH. In this case, information (e.g., reserved MCS value) of other field may be mapped to the CSI configuration in a similar manner to the CSI request field.

Further, a criterion for determining the DCI for triggering the CSI on the PUCCH may be provided separately from the above-described methods.

As a specific example, Table 7 below represents a description of a scheme of configuring the above-described CSI request field and determination of a transport block size (TBS).

TABLE 7

| 8.6.2 Transport block size determination |
|---|
| For a non-BL/CE UE and for $0 \leq I_{MCS} \leq 28$, the UE shall first determine the TBS index ($I_{TBS}$) using $I_{MCS}$ and Table 8.6.1-1 except if the transport block is disabled in DCI format 4/4A/4B as specified below. For a transport block that is not mapped to two-layer spatial multiplexing, the TBS is determined by the procedure in subclause 7.1.7.2.1. For a transport block that is mapped to two-layer spatial multiplexing, the TBS is determined by the procedure in subclause 7.1.7.2.2. For a non-BL/CE UE and for $29 \leq I_{MCS} \leq 31$, if DCI format 0/0A/0B is used and $I_{MCS} = 29$ or, if DCI format 4 is used and only 1 TB is enabled and $I_{MCS} = 29$ for the enabled TB and the number of transmission layers is 1 or if DCI format 4A/4B is used and $I_{MCS} = 29$ for both TBs and N = 1 (determined by the procedure in subclause 8.0), and if the "CSI request" bit field is 1 bit and is set to trigger an aperiodic CSI report and $N_{PRB} \leq 4$ or, the "CSI request" bit field is 2 bits and is triggering an aperiodic CSI report for one serving cell according to Table 7.2.1-1A, and, $N_{PRB} \leq 4$ or, the "CSI request" bit field is 2 bits and is triggering aperiodic CSI report for more than one serving cell according to Table 7.2.1-1A and, $N_{PRB} \leq 20$ or, the "CSI request" bit field is 2 bits and is triggering an aperiodic CSI report for one CSI process according to Table 7.2.1-1B and $N_{PRB} \leq 4$ or, the "CSI request" bit field is 2 bits and is triggering an aperiodic CSI report for more than one CSI process according to Table 7.2.1-1B and, $N_{PRB} \leq 20$ or, the "CSI request" bit field is 2 bits and is triggering an aperiodic CSI report for one CSI process or {CSI process, CSI subframe set}-pair according to Table 7.2.1-1C and $N_{PRB} \leq 4$ or, the "CSI request" bit field is 2 bits and is triggering an aperiodic CSI report for more than one CSI process and/or {CSI process, CSI subframe set}-pair according to Table 7.2.1-1C and $N_{PRB} \leq 20$,, or the "CSI request" bit field is 3 bits and is triggering an aperiodic CSI report for one CSI process according to Table 7.2.1-1D or Table 7.2.1-1E and $N_{PRB} \leq 4$, or the "CSI request" bit field is 3 bits and is triggering an aperiodic CSI report for 2 to 5 CSI processes according to Table 7.2.1-1D or Table 7.2.1-1E and $N_{PRB} \leq 20$, or the "CSI request" bit field is 3 bits and is triggering an aperiodic CSI report for more than 5 CSI processes according to Table 7.2.1-1D or Table 7.2.1-1E, or the "CSI request" bit field in DCI format 0A/0B/4A/4B is set to trigger an aperiodic CSI report, then there is no transport block for the UL-SCH and only the control information feedback for the current PUSCH reporting mode is transmitted by the UE. Otherwise, the transport block size shall be determined from the initial PDCCH/EPDCCH for the same transport block using $0 \leq I_{MCS} \leq 28$. If there is no initial PDCCH/EPDCCH with an uplink DCI format for the same transport block using $0 \leq I_{MCS} \leq 28$, the transport block size shall be determined from the most recent semi-persistent scheduling assignment PDCCH/EPDCCH, when the initial PUSCH for the same transport block is semi-persistently scheduled, or, the random access response grant for the same transport block, when the PUSCH is initiated by the random access response grant. In DCI format 4 a transport block is disabled if either the combination of $I_{MCS} = 0$ and $N_{PRB} > 1$ or the combination of $I_{MCS} = 28$ and $N_{PRB} = 1$ is signaled, otherwise the transport block is enabled. In DCI formats 4A/4B a transport block is disabled if $I_{MCS} = 29$ and otherwise the transport block is enabled. If DCI format 4A/4B is used and $I_{MCS} = 29$ for both TBs, UE is not expected to receive the value of N > 1 as determined by the procedure in subclause 8.0. For a BL/CE UE configured with CEModeA and a PUSCH transmission not scheduled by the Random Access Response Grant, the UE shall first determine the TBS index ($I_{TBS}$) using $I_{MCS}$ and Table 8.6.1-2. For a BL/CE UE the TBS is determined by the procedure in subclause 7.1.7.2.1. For a BL/CE UE configured with CEModeA and a PUSCH transmission scheduled by the Random Access Response Grant, the UE shall determine the TBS index by the procedure in subclause 6.2. For a BL/CE UE configured with CEModeB, the TBS is determined according to the procedure in subclause 7.1.7.2.1 for $0 \leq I_{TBS} \leq 10$, and $N_{PRB} = 6$ when resource allocation field is '110' or '111' otherwise $N_{PRB} = 3$. |

Further, when a certain DCI is determined to trigger the CSI on the PUCCH, it may be useful to disregard the criterion for the CSI on the PUSCH. In other words, when a certain DCI is determined to trigger the CSI on the PUCCH, although it is determined to be UL data (i.e., UL-SCH)-less UCI transmission on PUSCH by the above-described methods, the UE may be configured to transmit the UCI on the PUCCH configured according to the associated CSI configuration without transmitting the UCI on the PUSCH.

In this case, the criterion for the UCI transmission on the PUSCH without UL data may be used to trigger the CSI on the PUCCH without allocating a separate PUSCH resource via DCI. Specifically, where CSI on a pre-allocated PUCCH is triggered without allocating other resources via DCI, the above-described triggering condition for UCI transmission on PUSCH without UL data may be used. Further, through this, the triggering criterion of CSI on PUCCH may be configured independently from the CSI case on PUSCH.

Further, in various embodiments of the disclosure, where a slot aggregation factor (e.g., slot-aggregation-factor DL/UL, ReptK included in ConfiguredGrantConfig) is configured in the UE, one time/frequency resource allocation may indicate a larger resource or multiple resources. In this case, the operations of the above-described methods of using time/frequency resource allocation may be required to be varied. At this time, the following example schemes may be considered.

For example, the UE interprets the parameter under the assumption that the slot aggregation factor K is 1 and, then, if it determines that the received DCI is the DCI for UL data (i.e., UL-SCH)-less UCI transmission, although the slot aggregation factor K is configured, the UE may be configured to perform UCI transmission only in the first resource or a predesignated resource without applying the slot aggregation factor to the UCI.

As another example, the UE interprets the parameter under the assumption that the slot aggregation factor K is 1 and, then, if it determines that the received DCI is the DCI for UL data (i.e., UL-SCH)-less UCI transmission, the UE may be configured to apply the slot aggregation factor to the UCI and perform UCI transmission. As an example, if K is 4, the UE may perform the same UCI transmission (particularly, UL data-less UCI transmission) on four consecutive slots.

As another example, the UE interprets the parameter under the assumption that the slot aggregation factor K is 1 and, then, if it determines that the received DCI is the DCI for UL data (i.e., UL-SCH)-less UCI transmission, the UE may be configured to apply the slot aggregation factor to the UCI and perform UCI transmission. At this time, upon differentiating the DCI with the slot aggregation factor-applied parameter, a K-considered condition may be used. As an example, where the DCI is differentiated based on the number (i.e., N_RE) of REs given from the resource allocation field, $N\_RE \leq K \cdot 4 \cdot Q(12 \cdot 14 - RE_{overhead})$ may be used as a DCI differentiation condition.

Further, the above-described operation(s) related to the transmission using the slot aggregation factor and multiple resources are not limited to the parameter indicating the repetitive transmission in slot units configured via high layer signaling but may also be applied to repetitive transmission in units smaller than the repetitive transmission parameter, particularly slot, indicated via the DCI.

FIG. 7 is a flowchart illustrating operations of a UE transmitting uplink control information in a wireless communication system to which a method as proposed according to the disclosure is applicable. FIG. 7 is intended merely for illustration purposes but not for limiting the scope of the disclosure.

Referring to FIG. 7, it is assumed that as a scheme for designing DCI for transmission of uplink control information (UCI), the UE and/or base station combines and applies any one or more of the above-described methods.

First, the UE may receive DCI for scheduling transmission of UCI from the base station (step S705).

Thereafter, the UE may transmit the UCI to the base station via a physical uplink shared channel (i.e., PUSCH) based on the DCI (step S710).

In this case, a specific field included in the DCI may include indication information related to whether the uplink control information is only transmitted via the uplink shared channel.

For example, as in method 1 described above, the specific field may be a channel state information (CSI) request field, and the indication information may be a specific value of the CSI request field pre-configured for the uplink control information via higher layer signaling.

And/or, as in method 2 described above, the specific field may be a modulation and coding scheme (MCS) field, and the indication information may be a reserved MCS value among pre-configured MCS values.

And/or, as in method 5 described above, the specific field may be a hybrid automatic repeat and request (HARQ)-related field, and the indication information may be a specific HARQ process identifier pre-configured for the uplink control information.

And/or, as in method 6 described above, the specific field may be a resource allocation field in a time domain, and the indication information may be a starting symbol value of the physical uplink shared channel, pre-configured for the uplink control information.

And/or, as in methods 8 to 10 described above, the specific field may be a resource allocation field, and the indication information may be a resource size in a time domain and/or a resource size in a frequency domain, pre-configured for the uplink control information.

In connection therewith, the UE may be configured as a device shown in FIGS. 9 and 10. Given this, the operations of FIG. 7 described above may be performed by the device of FIGS. 9 and 10.

For example, the processor 921 (and/or processor 1010) may control to receive the DCI for scheduling transmission of UCI from the base station (step S705). Further, the processor 921 (and/or processor 1010) may control to transmit the UCI to the base station via a physical uplink shared channel (i.e., PUSCH) based on the DCI (step S710).

FIG. 8 is a flowchart illustrating operations of a base station receiving uplink control information in a wireless communication system to which a method as proposed according to the disclosure is applicable. FIG. 8 is intended merely for illustration purposes but not for limiting the scope of the disclosure.

Referring to FIG. 8, it is assumed that as a scheme for designing DCI for transmission of uplink control information (UCI), the UE and/or base station combines and applies any one or more of the above-described methods.

First, the base station may transmit DCI for scheduling transmission of UCI to the UE (step S805).

Thereafter, the base station may receive the UCI from the UE via a physical uplink shared channel (i.e., PUSCH) based on the DCI (step S810).

In this case, a specific field included in the DCI may include indication information related to whether the uplink control information is only transmitted via the uplink shared channel.

For example, as in method 1 described above, the specific field may be a channel state information (CSI) request field, and the indication information may be a specific value of the CSI request field pre-configured for the uplink control information via higher layer signaling.

And/or, as in method 2 described above, the specific field may be a modulation and coding scheme (MCS) field, and the indication information may be a reserved MCS value among pre-configured MCS values.

And/or, as in method 5 described above, the specific field may be a hybrid automatic repeat and request (HARQ)-related field, and the indication information may be a specific HARQ process identifier pre-configured for the uplink control information.

And/or, as in method 6 described above, the specific field may be a resource allocation field in a time domain, and the indication information may be a starting symbol value of the physical uplink shared channel, pre-configured for the uplink control information.

And/or, as in methods 8 to 10 described above, the specific field may be a resource allocation field, and the indication information may be a resource size in a time domain and/or a resource size in a frequency domain, pre-configured for the uplink control information.

In connection therewith, the base station may be configured as a device shown in FIG. 9. Given this, the operations of FIG. 8 described above may be performed by the device of FIG. 9.

For example, the processor 911 may control to transmit the DCI for scheduling transmission of UCI to the UE (step S805). Further, the processor 911 may control to receive the UCI transmitted from the UE via the physical uplink shared channel (i.e., PUSCH) based on the DCI (step S710).

Use of the above-described scheme provides the technical effect of differentiating between the DCI for allocating a normal PUSCH (e.g., PUSCH for UL data) and the DCI for allocating a PUSCH for UCI transmission without UL data without losing flexibility of resource allocation, for downlink control information received from the base station.

General Apparatus to which the Disclosure May be Applied

FIG. 9 is a block diagram of a wireless communication device to which a method proposed in this specification may be applied.

Referring to FIG. 9, the wireless communication system includes a base station 910 and a plurality of terminals (or UEs) 920 located within the region of coverage of the BS 910.

The BS 910 includes a processor 911, a memory 912, and a radio frequency (RF) unit 913. The processor 911 implements functions, processes and/or methods proposed in above-described FIG. 1 to FIG. 8. Layers of radio interface protocols may be implemented by the processor 911. The memory 912 may be connected to the processor 911 and stores various types of information for driving the processor 911. The RF unit 913 may be connected to the processor 911 and transmits and/or receives a radio signal.

The UE 920 includes a processor 921, a memory 922 and an RF unit 923.

The processor 921 implements the proposed functions, processes and/or methods proposed in FIG. 1 to FIG. 8. Layers of radio interface protocols may be implemented by the processor 921. The memory 922 may be connected to the processor 921 and stores various types of information for driving the processor 921. The RF unit 923 may be connected to the processor 921 and transmits and/or receives a radio signal The memory 912, 922 may be located inside or outside the processor 911, 921 and may be connected to the processor 911, 921 by various known means.

As an example, to transmit/receive downlink (DL) data in a wireless communication system supporting low-latency service, the UE may include a radio frequency (RF) unit for transmitting/receiving radio signals and a processor functionally connected with the RF unit.

The base station 910 and/or the UE 920 may include a single or multiple antennas.

FIG. 10 is a block diagram illustrating a configuration of a communication device according to an embodiment of the disclosure.

In particular, FIG. 10 illustrates in greater detail the UE of FIG. 9.

Referring to FIG. 10, the UE may include a processor (or a digital signal processor (DSP)) 1010, an RF module (or RF unit) 1035, a power management module 1005, an antenna 1040, a battery 1055, a display 1015, a keypad 1020, a memory 1030, a subscriber identification module (SIM) card 1025 (which is optional), a speaker 1045, and a microphone 1050. The UE may include a single or multiple antennas.

The processor 1010 implements the functions, processes or steps, and/or methods proposed above in connection with FIGS. 1 to 8. Wireless interface protocol layers may be implemented by the processor 1010.

The memory 1030 is connected with the processor 1010 to store information related to the operation of the processor 1010. The memory 1030 may be positioned inside or outside the processor 1010 and be connected with the processor 1010 via various known means.

For example, the user inputs instruction information, e.g., a phone number, by voice activation using the microphone 1050 or by pressing (or touching) a button of the keypad 1020. The processor 1010 receives the instruction information and handles performing a proper function, e.g., calling at the phone number. Operational data may be extracted from the SIM card 1025 or the memory 1030. Further, the processor 1010 may display the instruction information or operational information on the display 1015 for convenience or user's recognition.

The RF module 1035 is connected with the processor 1010 to transmit and/or receive RF signals. The processor 1010 transfers instruction information to the RF module 1035 to initiate communication, e.g., to transmit a wireless signal constituting voice communication data. The RF module 1035 includes a receiver and a transmitter for receiving and transmitting wireless signals. The antenna 1040 functions to transmit and receive wireless signals. Upon receiving a wireless signal, the RF module 1035 transfers the signal for processing by the processor 1010 and convert the signal into a base-band signal. The processed signal may be converted into readable or audible information output via the speaker 1045.

FIG. 11 is a diagram illustrating an example of the RF module of a wireless communication device to which a method proposed in this specification may be applied.

Specifically, FIG. 11 shows an example of an RF module that may be implemented in a frequency division duplex (FDD) system.

First, in a transmission path, the processor described in FIG. 8 and FIG. 9 processes data to be transmitted and provides an analog output signal to a transmitter 1110.

In the transmitter 1110, the analog output signal is filtered by a low pass filter (LPF) 1111 in order to remove images caused by digital-to-analog conversion (ADC). The signal is up-converted from a baseband to an RF by a mixer 1112 and is amplified by a variable gain amplifier (VGA) 1113. The amplified signal is filtered by a filter 1114, additionally amplified by a power amplifier (PA) 1115, routed by a duplexer(s) 1150/antenna switch(es) 1160, and transmitted through an antenna 1170.

Furthermore, in a reception path, the antenna 1170 receives signals from the outside and provides the received signals. The signals are routed by the antenna switch(es) 1160/duplexers 1150 and provided to a receiver 1120.

In the receiver 1120, the received signals are amplified by a low noise amplifier (LNA) 1123, filtered by a band pass filter 1124, and down-converted from the RF to the baseband by a mixer 1125.

The down-converted signal is filtered by a low pass filter (LPF) 1126 and amplified by a VGA 1127, thereby obtaining the analog input signal. The analog input signal is provided to the processor described in FIGS. 8 and 9.

Furthermore, a local oscillator (LO) 1140 generates transmission and reception LO signals and provides them to the mixer 1112 and the mixer 1125, respectively.

Furthermore, a phase locked loop (PLL) 1130 receives control information from the processor in order to generate transmission and reception LO signals in proper frequencies, and provides control signals to the local oscillator 1140.

Furthermore, the circuits shown in FIG. 11 may be arrayed differently from the configuration shown in FIG. 11.

FIG. 12 is a diagram illustrating another example of the RF module of a wireless communication device to which a method proposed in this specification may be applied.

Specifically, FIG. 12 shows an example of an RF module that may be implemented in a time division duplex (TDD) system.

The transmitter 1210 and receiver 1220 of the RF module in the TDD system have the same structure as the transmitter and receiver of the RF module in the FDD system.

Hereinafter, only a different structure between the RF module of the TDD system and the RF module of the FDD system is described. Reference is made to the description of FIG. 10 for the same structure.

A signal amplified by the power amplifier (PA) 1215 of the transmitter is routed through a band select switch 1250, a band pass filter (BPF) 1260 and an antenna switch(es) 1270 and is transmitted through an antenna 1280.

Furthermore, in a reception path, the antenna 1280 receives signals from the outside and provides the received signals. The signals are routed through the antenna switch(es) 1270, the band pass filter 1260 and the band select switch 1250 and are provided to the receiver 1220.

The aforementioned implementations are achieved by a combination of structural elements and features of the disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the implementations of the disclosure. The order of operations described in the implementations of the disclosure may be changed. Some structural elements or features of one implementation may be included in another implementation, or may be replaced with corresponding structural elements or features of another implementation. Moreover, it is apparent that some claims referring to specific claims may be combined with another claims referring to the other claims other than the specific claims to constitute the implementation or add new claims by means of amendment after the application is filed.

The implementations of the disclosure may be achieved by various means, for example, hardware, firmware, software, or a combination thereof. In a hardware configuration, the methods according to the implementations of the disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the implementations of the disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

INDUSTRIAL APPLICABILITY

The scheme for transmitting and receiving uplink control information in a wireless communication system of the disclosure has been illustrated as being applied to a 3GPP LTE/LTE-A system and a 5G system (new RAT system), but may be applied to various other wireless communication systems.

The invention claimed is:

1. A method of transmitting uplink control information by a user equipment (UE) in a wireless communication system, the method comprising:
receiving, from a base station, downlink control information (DCI) for scheduling transmission of the uplink control information; and
transmitting, to the base station, the uplink control information via a physical uplink shared channel based on the DCI,
wherein a specific field included in the DCI includes indication information related to whether only the uplink control information is transmitted via the physical uplink shared channel,
wherein the specific field is a resource allocation field, and
wherein the indication information is a resource size in a time domain, pre-configured for the uplink control information.

2. A user equipment (UE) transmitting uplink control information in a wireless communication system, the UE comprising:
a radio frequency (RF) unit including a transceiver for transmitting and receiving a radio signal; and
a processor functionally connected with the RF unit, wherein
the processor controls to:
receive, from a base station, downlink control information (DCI) for scheduling transmission of the uplink control information; and transmit, to the base station, the uplink control information via a physical uplink shared channel based on the DCI, and wherein a specific field included in the DCI includes indication information related to whether only the uplink control information is transmitted via the physical uplink shared channel, wherein the specific field is a resource allocation field, wherein the indication information is a resource size, pre-configured for the uplink control information, and wherein the resource size is a combination of a resource allocation in a time domain and a resource allocation in a frequency domain.

3. A base station receiving uplink control information in a wireless communication system, the base station comprising:

a radio frequency (RF) unit including a transceiver for transmitting and receiving a radio signal; and a processor functionally connected with the RF unit, wherein the processor controls to:

transmit, to a user equipment (UE), downlink control information (DCI) for scheduling transmission of the uplink control information; and receive, from the UE, the uplink control information via a physical uplink shared channel based on the DCI, and wherein a specific field included in the DCI includes indication information related to whether only the uplink control information is transmitted via the physical uplink shared channel, wherein the specific field is a resource allocation field, and wherein the indication information is a resource size in a time domain, pre-configured for the uplink control information.

* * * * *